(12) United States Patent
Nohl

(10) Patent No.: US 6,296,109 B1
(45) Date of Patent: Oct. 2, 2001

(54) FOLD LINKAGE AND METHOD OF USING SAME

(75) Inventor: Jerry Nohl, Morris, MN (US)

(73) Assignee: Astec Industries Inc., Chattanooga, TN (US)

( * ) Notice: Subject to any disclaimer, the term of this patent is extended or adjusted under 35 U.S.C. 154(b) by 0 days.

(21) Appl. No.: 09/496,909

(22) Filed: Feb. 2, 2000

(51) Int. Cl.⁷ ..................................... B65G 21/10
(52) U.S. Cl. ........................ 198/632; 198/861.3
(58) Field of Search .................... 198/313, 538, 198/632, 861.2, 861.3

(56) References Cited

U.S. PATENT DOCUMENTS

| | | |
|---|---|---|
| 3,085,675 | 4/1963 | Feiteira, Jr. . |
| 3,134,480 | 5/1964 | Loosli . |
| 3,417,882 | 12/1968 | McConnell . |
| 3,616,893 * | 11/1971 | Knadle et al. .................. 198/632 |
| 4,063,375 | 12/1977 | Satterwhite . |
| 5,360,097 | 11/1994 | Hibbs . |
| 5,662,210 | 9/1997 | Toews . |
| 5,819,950 * | 10/1998 | McCloskey ..................... 198/313 |
| 6,186,311 * | 11/1998 | Conner .......................... 198/313 |

* cited by examiner

Primary Examiner—Joseph E. Valenza
(74) Attorney, Agent, or Firm—Nilles & Nilles SC

(57) ABSTRACT

A fold linkage is provided that is usable in combination with a conveyor assembly having a foldable conveyor section and a main conveyor section. The fold linkage includes linkage members and hinge sections that are rotatably attached to each other and that are connectable to the conveyor sections without interference with the conveyor assembly truss members. The fold linkage further includes a pressure operated cylinder that is extendable and retractable so as to fold and unfold the conveyor assembly.

8 Claims, 7 Drawing Sheets

FOLD LINKAGE AND METHOD OF USING SAME

BACKGROUND OF THE INVENTION

1. Field of the Invention

The invention relates to a fold linkage for a conveyor that permits the conveyor to be folded for transport, and more particularly, relates to a fold linkage that may be preassembled and mounted onto the conveyor while avoiding modification of the conveyor frame.

2. Discussion of the Related Art

Methods for folding a conveyor to facilitate transport are well known. Prior assemblies typically include a foldable conveyor section that is hingedly attached to a main conveyor section via a fold linkage, which includes a plurality of linkage members that are attached to the conveyor frame. Typically, the fold linkage includes a fluid operated cylinder having an extendible piston that is attached to one of a plurality of the linkage members, which are rotatably attached to each other via a corresponding plurality of joints. More specifically, the joints may rotatably connect the linkage members to the rod, the main conveyor section, and/or the folding conveyor section. As a result, actuation of the hydraulic cylinder correspondingly folds or unfolds the foldable conveyor section about the main section via the fold linkage until the conveyor is configured for transport or operation, respectively.

Conventional fold linkages suffer from several drawbacks. Specifically, because a plurality of the joints attaches the linkage members directly to the truss frame members, manufacture of prior told linkages is expensive and inefficient. The truss frame is therefore modified within tight tolerances in order to accommodate the joints of the fold linkage. This requires significant time and expense.

Additionally, in some prior fold linkage assemblies, the first and second linkages are joined by links that extend through the conveyor, resulting in further necessary modifications to the truss members. The interaction between prior fold linkages and truss members prohibits manufacture of a modular fold linkage prior to attaching the linkage onto the conveyor. Instead, the fold linkage needs to be assembled while, at the same time, integrated with the truss members and frame.

What is therefore needed is a fold linkage for a conveyor that is modular so as to allow the fold linkage to be preassembled before being mounted onto the conveyor, and that includes joints that are free from contact and interference with the truss members.

OBJECTS AND SUMMARY OF THE INVENTION

It is therefore an object of the invention to provide a fold linkage that is usable in combination with a conveyor to fold and unfold the conveyor.

It is a further object of the invention to provide a fold linkage that is modular and that is configured so as to be pre-assembled into a fixture prior to being mounted onto the conveyor.

It is a further object of the invention to provide a fold linkage that does not require modification of the truss members of the conveyor when the fold linkage is mounted onto the conveyor.

It is a further object of the invention to provide a fold linkage having a relief valve to accommodate a hopper that is disposed on the conveyor.

It is a further object of the invention to provide a method of producing a fold linkage that incorporates at least some of the above-mentioned objects.

It is a further object of the invention to provide a method of operating a fold linkage in accordance with an embodiment of the invention.

In accordance with a first aspect of the invention, a conveyor includes a foldable conveyor section that is foldable with respect to a main conveyor section. The foldable and main conveyor sections are hingedly attached to each other via a fold linkage, which includes a first hinge section that is hingedly attached to a second hinge section. The first hinge section is mounted onto the main conveyor section, and the second hinge section is mounted onto the foldable conveyor section. The fold linkage in accordance with the preferred embodiment includes a pair of pressure operated cylinders disposed on opposite sides of the fold linkage, each of which includes corresponding pistons that are extendable and retractable so as to actuate a plurality of linkage members to rotate the second hinge section relative to the first hinge section. Extension of the pistons thereby rotates the foldable conveyor section from an unfolded position to a folded position to facilitate transport of the conveyor. The foldable conveyor section becomes unfolded, thereby rendering the conveyor operational, when the pistons are retracted. Advantageously, the rods of the cylinders are protected from potential hazards during operation of the conveyor.

In accordance with another aspect of the invention, the first and second hinge sections are rotatably attached to one another, and are further rotatably attached to the linkage members associated with the fold linkage. Furthermore, the linkage members are not connected to the truss members. Moreover, the linkage members do not extend through the truss frame. As a result, the fold linkage in accordance with an embodiment of the invention may be preassembled into a fixture prior to being mounted onto the conveyor.

In accordance with another aspect of the invention, the link members in accordance with an embodiment of the invention are rotatably attached to other link members or to a hinge section. As a result, the link members are not attached to the truss members of the conveyor frame. Accordingly, the truss members do not require modification in order to accommodate the fold linkage.

In accordance with another aspect of the invention, the foldable conveyor section includes a conventional hopper that is disposed at an end of the section opposite the end that is connected to the main section. In order to protect the hopper or other conveyor or fold linkage members from damage when the foldable conveyor section is folded, the cylinders include a relief valve that is operable to limit the amount of pressure that is accumulated within the cylinders once the pistons extend to a predetermined distance. The limited pressure within the cylinders correspondingly limits the force that causes the pistons to extend, thereby limiting the force with which the foldable conveyor section is biased towards the main conveyor section. The fold linkage and conveyor section are thereby protected from potential damage.

In accordance with another aspect of the invention, a method of assembling a fold linkage in accordance with an embodiment of the invention includes rotatably connecting a first hinge section to a second hinge section. A pair of hydraulic cylinders is rotatably connected to the first hinge section at one end, and to a corresponding pair of pivot arms at a second, opposite end. The pivot arms are also rotatably connected to the first conveyor section at another location, and to a corresponding pair of link arms at still another location. The pair of link awns is rotatably connected to the second hinge section. The first and second hinge sections are mounted onto the main and foldable conveyor sections, respectively.

In accordance with another aspect of the invention, a method of operating a fold linkage in accordance with an embodiment of the invention includes extending the pistons of the pressure operated cylinders when the conveyor is in an unfolded position. Extending the pistons folds the foldable conveyor section about the main conveyor section until the conveyor is folded for transport. Likewise, to unfold the conveyor, the pistons are retracted to unfold the foldable conveyor section about the main section so as to render the conveyor operational.

Other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENT

Pursuant to a preferred embodiment of the invention, a fold linkage includes a first hinge section that is rotatably connected to a second hinge section. A plurality of linkage members is rotatably connected to the hinge sections and to one another via respective joints. A pair of fluid pressure operated cylinders and corresponding pistons are operable to permit the second hinge section to be rotated relative to the first hinge section. The first hinge section is mounted onto the top of a main conveyor section of a conveyor, and the second hinge section is mounted onto the top of a foldable conveyor section, which is rotatably connected to the main conveyor section. The foldable conveyor section is unfoldable with respect to the main conveyor section to permit operation of the conveyor, and is foldable to allow the conveyor to be easily transported. Advantageously, the fold linkage is modular and may be preassembled into a fixture before being mounted onto the conveyor. Furthermore, the joints are arranged so as to avoid interference with the conveyor and its associated truss members when the fold linkage is mounted.

Figure 1:
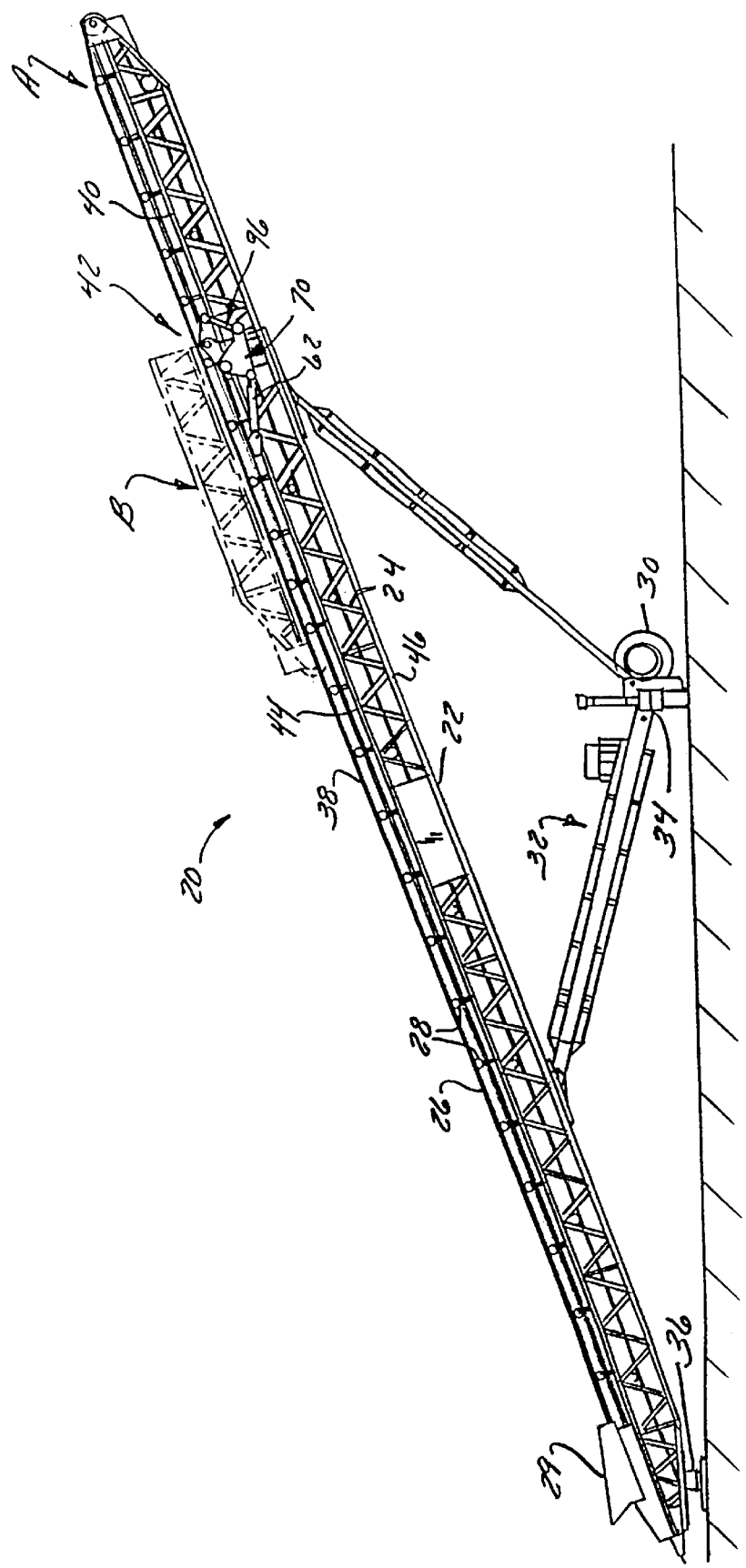
FIG. 1 is a side elevation view of a conveyor having a fold linkage in constructed in accordance with a preferred embodiment of the invention.

Referring initially to FIG. 1, a conveyor assembly 20 includes a conveyor frame 22 that is supported by truss members 24. An endless conveyor 26 surrounds a plurality of rollers 28, which are attached to the conveyor frame 22. Additionally, a hopper 29 is located at one end of the conveyor assembly 20, as is well known in the art. The assembly 20 includes a main conveyor section 38 and a foldable conveyor section 40, which is foldable from the operating position A to the transport position B via a fold linkage 42, shown in FIG. 1. While the fold linkage 42 is preferably formed from steel, any other suitable material may be used in accordance with the preferred embodiment.

When in the operating position, the conveyor assembly 20 is supported by a undercarriage assembly 32 and a support 36. When the assembly 20 is to be transported, a releasable brake mechanism 34 is released, which allows the conveyor to be transported via wheels 30, as is well known in the art.

Figure 2:
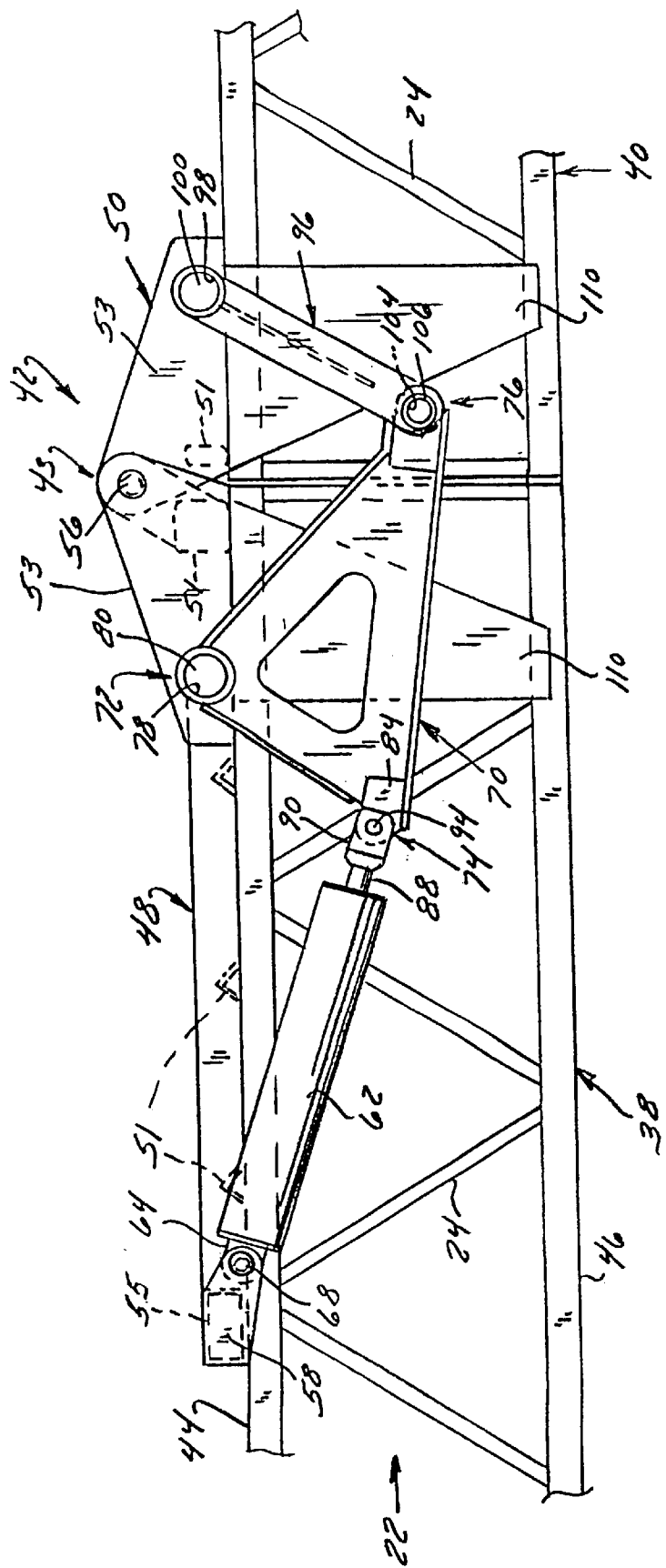
FIG. 2 is a side elevation view of the fold linkage of FIG. 1.
Figure 5:
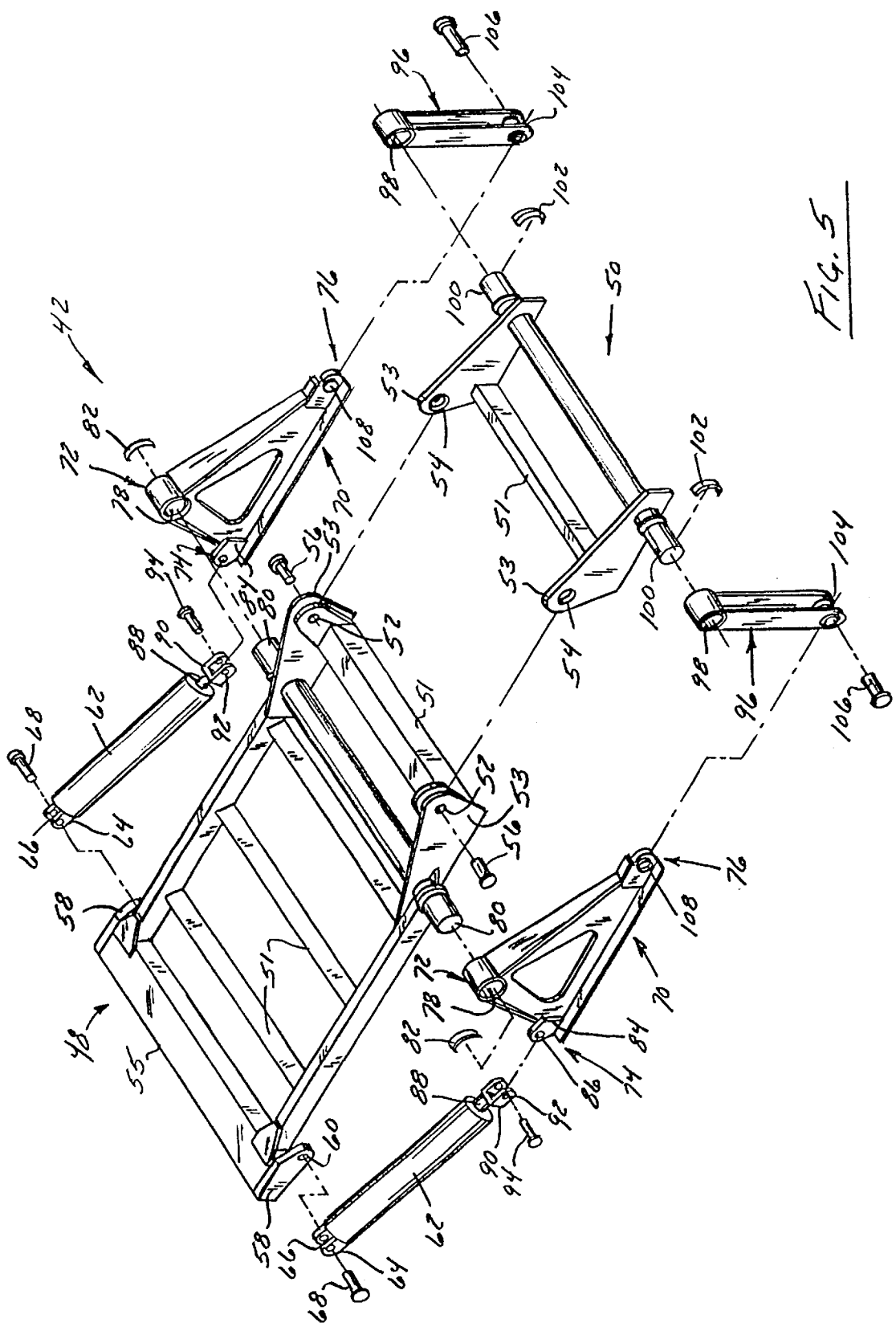
FIG. 5 is an exploded perspective view of the fold linkage of FIG. 2 being assembled in accordance with the preferred embodiment.

Referring now also to FIGS. 2 and 5, the conveyor frame 22 includes an upper frame member 44 and a lower frame member 46. The fold linkage 42 comprises a first hinge section 48 that is mounted onto the top of the main conveyor section 38 via a conventional welding operation, and a second hinge second 50 that is mounted onto the top of the foldable conveyor section 40 also via welding. While welding is used in accordance with the preferred embodiment, it should be appreciated that any other suitable method and apparatus could be used. The hinge sections 48 and 50 include a plurality of support members 51, and a corresponding pair of generally triangular flanges 53 that are rotatably connected to each other as will be described in further detail below. The first hinge section 48 further includes a rear plate 55 having a corresponding pair of flanges 58 disposed on an outer edge of the rear support plate. The main conveyor section 38 and foldable conveyor section 40 include reinforcing plates 110 that are located at joint 43.

The first and second hinge sections 48 and 50 include holes 52 and 54 (FIG. 5), respectively, that are aligned and that are secured via pins 56. A fluid pressure operated cylinder and corresponding piston, comprising a hydraulic cylinder 62 and rod 88 in the preferred embodiment, includes a flange 64 having opening 66 that mates with a corresponding hole 60 on flange 58 to attach the cylinder to the hinge section 48 via a locking pin 68. The cylinder 62 is thereby rotatably connected to the hinge section 48. The size of the hinge sections 48 and 50 are designed in accordance with the size of the conveyor section to which they are attached in order to accommodate the stresses associated with operation.

While the fold linkage 42 includes two sets of linkage members that are generally aligned with each other and disposed on opposite sides of the hinge sections 48 and 50, only one set will be described in detail.

The fold linkage 42 further includes a pivot arm 70 having first, second, and third joints 72, 74, and 76 respectively. Joint 72 includes a generally cylindrical sleeve 78 that is mounted onto ends of a pivot shaft 80 that extends through the hinge section 48. A keeper 82 is then attached to the ends of the pivot shaft 80 to secure the rotatable connection of the pivot arm 70 to the hinge section 48. The pivot arm 70 includes a flange 84 having a generally circular opening 86 to partially form the second joint 74. The hydraulic cylinder 62 includes an extendible rod 88 having a coupler 90 that includes holes 92 that mate with opening 86. A pin 94 is inserted through the holes 92 and 86 to rotatably connect the pivot arm 70 to the hydraulic cylinder 62.

A link arm 96 is rotatably connected to the hinge section 50 via a generally cylindrical sleeve 98 and ends of a corresponding pivot shaft 100. A keeper 102 is attached to the pivot shaft 100 to secure the connection. The link aim 96 further includes a coupler 104 that mates with a generally cylindrical opening 108 of the third joint 76. A locking pin 106 is inserted into the coupler 104 and corresponding opening 108 to secure the rotatable connection of the pivot arm 70 to the link arm 96. Advantageously, because the fold linkage 42 is mounted to the upper frame member 44, the truss members require no modification to accommodate the fold linkage. Additionally, the fold linkage 42 may be preassembled before being mounted onto the conveyor 20.

Figure 3:
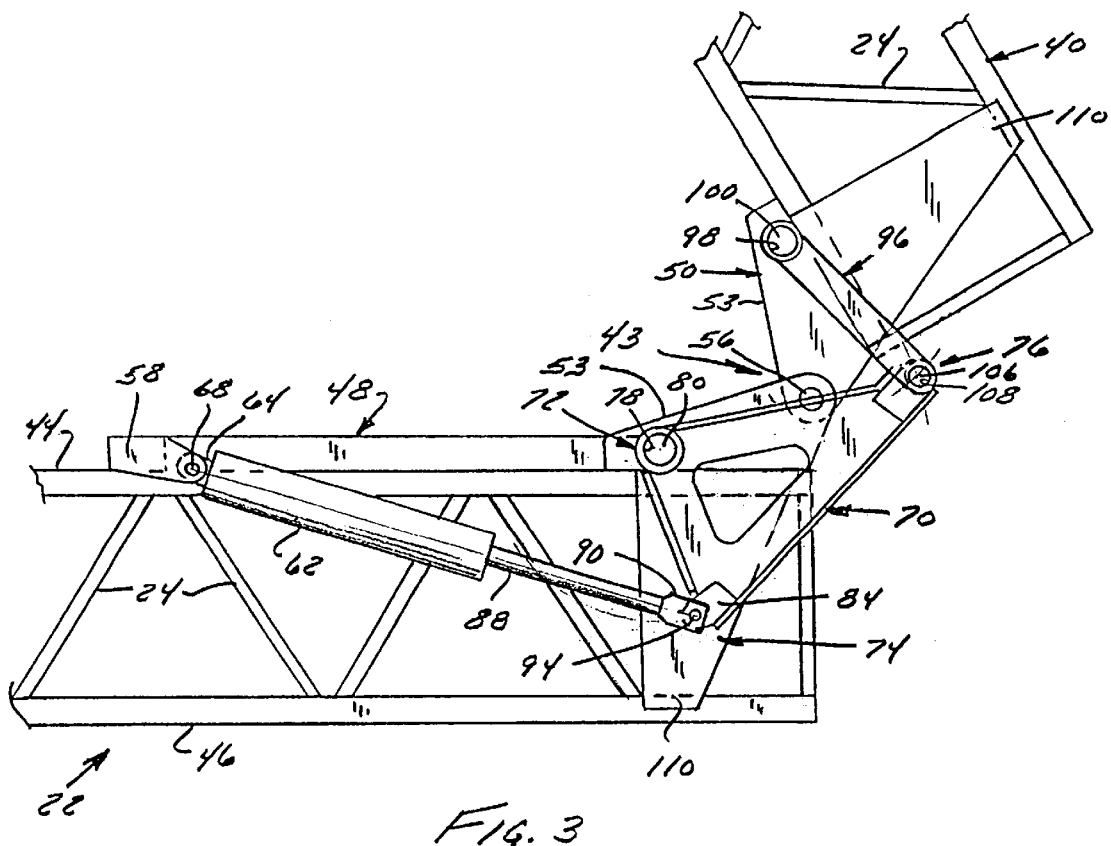
FIG. 3 is a side elevation view of the conveyor and fold linkage of FIG. 2 showing the conveyor in a partially folded position.
Figure 4:
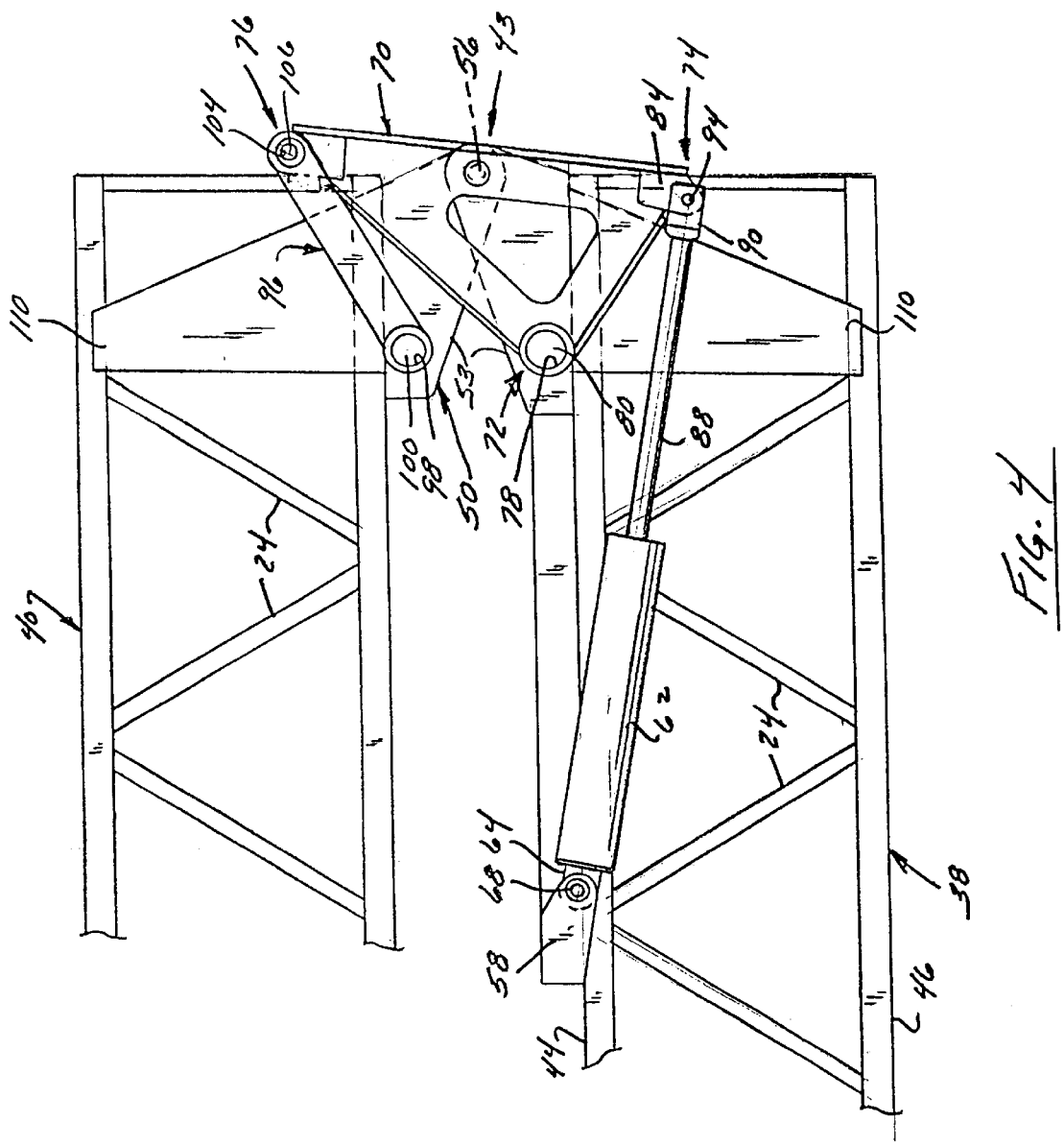
FIG. 4 is a side elevation view of the conveyor and fold linkage of FIG. 3 showing the conveyor in a folded position.

Referring to FIG. 2, the fold linkage 42 is shown as being in an unfolded position when the rod 88 of the hydraulic cylinder 62 is in a retracted position. In operation, as the cylinder rod 88 extends as shown in FIG. 3, the pivot arm 70 rotates about the first joint 72, thereby biasing the link arm 96 to rotate the hinge section 50 and corresponding foldable conveyor section 40 about joint 43 towards the folded position relative to the main conveyor section 38. Therefore, when the cylinder rod 88 is in an extended position, as shown in FIG. 4, the assembly 20 is fully folded, thereby enabling the conveyor to be transported. Likewise, the rod 88 is retracted to rotate the foldable conveyor section 40 to the unfolded position (FIG. 2) thereby rendering the conveyor assembly 20 operational. Advantageously, the rod 88 is retracted during operation of the cylinder, thereby protecting it from potential hazards.

Figure 6:
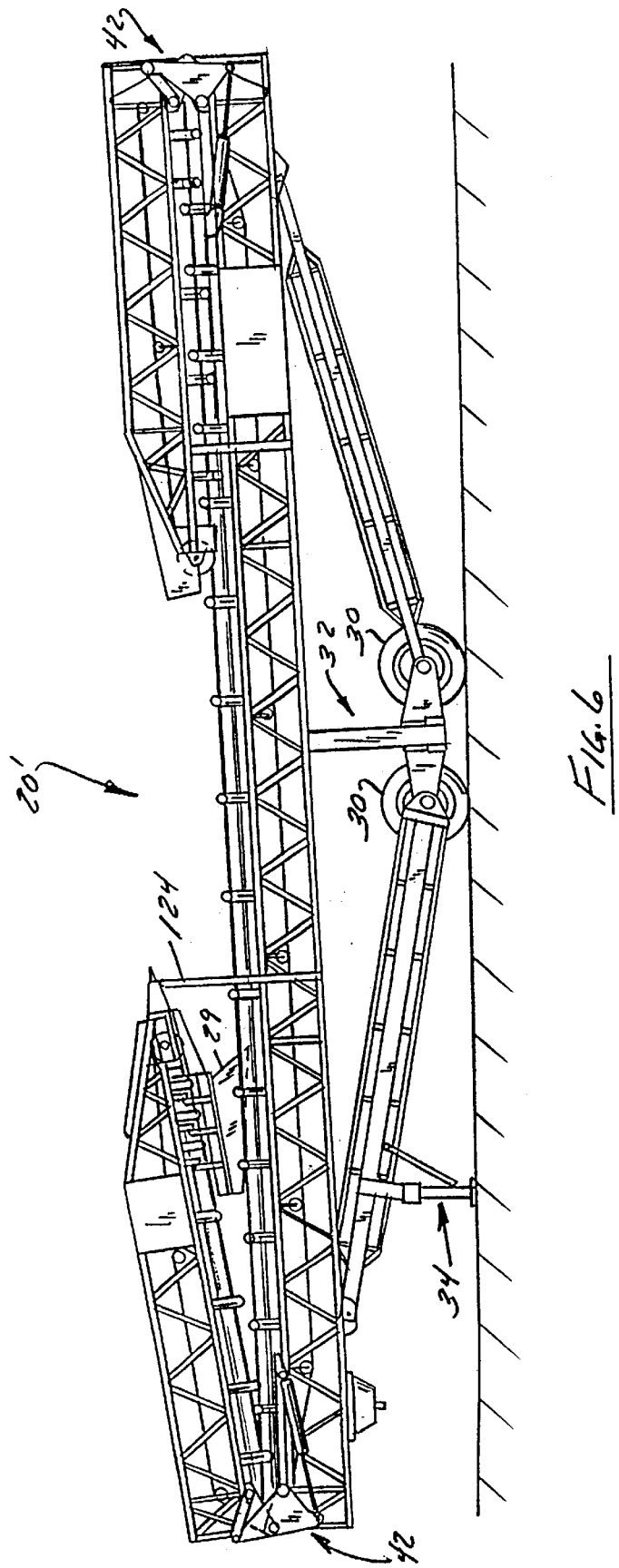
FIG. 6 is a side elevation view of a conveyor having a fold linkage in accordance with the preferred embodiment and a fold linkage in accordance with an alternate embodiment.
Figure 7:
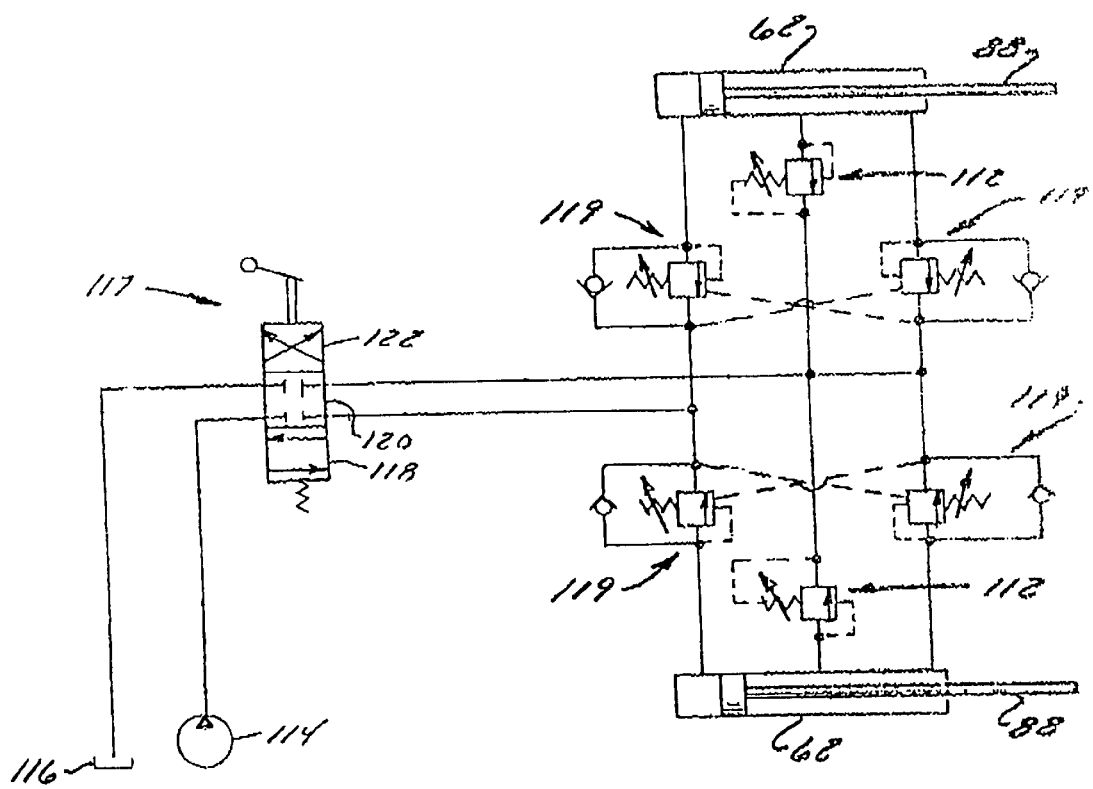
FIG. 7 is a schematic illustration of a pressure operated cylinder having a relief valve in accordance with an embodiment of the present invention.

Referring now also to FIGS. 6 and 7, the hydraulic cylinder 62 includes a three-way valve assembly 117 that, when in an "extend position" 118, supplies pressure to the hydraulic cylinders 62 from a source 114. When the valve assembly 117 is in a "lock position" 120, the pressure within the cylinders 62 will remain constants thereby locking the position of rods 88. When the valve assembly 117 is in a "retract position" 122, the fluid within the cylinders 62 will return to a tank 116 to reduce the pressure within the cylinders 62 and retract the rods 88.

The valve assembly further includes check valves 119 that prevent the release of fluid due to the forces associated with folding and unfolding the foldable conveyor section 40. For example, as the foldable conveyor section 40 is being folded past the "half-way" point (FIG. 3), the forces associated with gravity acting on the relatively large conveyor section could cause the valve assembly 117 to fail. The check valve 119 resists the fluid pressure that results from these forces, and ensures that the valve assembly 117 will be able to accommodate a full folding and unfolding operation without undergoing failure. In operation, as is well known in the art, a variable-resistance spring element acts in conjunction with a pilot pressure to either permit or restrict fluid flow through the check valve. When closed, the valve will permit only unidirectional fluid flow from the source 114 to the cylinder 62.

The valve assembly 117 may also include a relief valve 112 to accommodate the hopper 29. More specifically, the relief valve 112 allows pressure to escape from the cylinder 62 once the rod 88 has extended beyond a predetermined distance. The amount of permitted extension will be limited by the limited amount of permissible folding of the foldable conveyor section 40 in order to compensate for the hopper 29. Once the folding is completed, the rod 88 will be extended beyond the location of the relief valve 112. The relief valve 112 then activates, and the pressure within the cylinder 62 is limited. The limited pressure within the cylinder 62 correspondingly limits the amount of force applied to the members of the fold linkage 42 and the conveyor assembly 20' when the foldable conveyor section 40 is folded. For example, the amount of force that is supplied by the cylinder 62 when the rod 88 is extended beyond the location of the relief valve 112 may be a fraction of the force that is supplied before the rod 88 is extended beyond the location of the relief valve. The relief valve 112 thereby protects the hopper 29 and other members of the fold linkage 42 and conveyor assembly 20' from potential damage.

When the valve assembly 117 is in the "extend position" 118 and the rod 88 is extended beyond a predetermined distance, the relief valve will operate to allow pressure within the cylinder to escape into the tank 116. The amount of force with which the foldable conveyor section 40 is being biased against the main conveyor section is thereby limited. A stop 124 may also be attached to the main conveyor section 38 to support the foldable conveyor section 40 when it is in the folded position.

While the valve assembly has been described in accordance with an embodiment of the invention, it should be appreciated that other suitable arrangements incorporating a relief valve may be used.

Many other changes and modifications may be made to the invention without departing from the spirit thereof. The scope of the changes will become apparent from the appended claims.

I claim:

1. A modular fold linkage comprising:

a first section;

a second section that is rotatably connected to the first section;

a pivot arm having first, second, and third joints, wherein the first joint is rotatably connected to the first section;

a link arm connected to the second joint at one end, and to the second section of the conveyor at a second, opposite end; and an actuator that is attached to the first section at one end, and to the third joint at a second, opposite end, wherein actuation of the power device rotates the pivot arm so as to effect one of a folding and unfolding motion of the fold linkage.

2. The fold linkage of claim 1, wherein the first and second sections of the fold linkage are connected to corresponding first and second sections of a conveyor frame.

3. The fold linkage of claim 2, wherein all contact points between the linkage and the conveyor frame are free from contact with any internal members of the frame.

4. The fold linkage of claim 2, wherein the actuator comprises a fluid pressure operated cylinder and piston.

5. The fold linkage of claim 4, wherein the cylinder includes a relief valve to limit the pressure within the cylinder once the piston has extended beyond a predetermined distance.

6. The fold linkage of claim 5, wherein the piston is in a retracted position when conveyor is unfolded.

7. The fold linkage of claim 5, wherein the relief valve limits pressure within the cylinder so as to be one of equal to and less than a predetermined value.

8. A method for folding a foldable conveyor section about a main conveyor section, wherein a first hinge section is connected to the main conveyor section, and wherein a second hinge section is connected to the foldable conveyor section, and wherein the first hinge section is rotatably connected to the second hinge section, the method comprising:

extending a piston of a pressure operated cylinder, wherein the cylinder is connected to a first hinge section, and wherein the piston is connected to a pivot arm;

rotating the pivot arm, wherein the pivot arm is connected to the first hinge section at a first location, and wherein the pivot arm is connected to the piston at a second location, and wherein the pivot arm is connected to a link arm at a third location; and actuating the link arm, wherein the link arm is connected to the second hinge section, and wherein actuating the link arm rotates the foldable conveyor section relative to the main conveyor section.

\* \* \* \* \*